(12) United States Patent
Canini

(10) Patent No.: US 7,053,954 B1
(45) Date of Patent: May 30, 2006

(54) PROCESS FOR REGULATING THE EXPOSURE TIME OF A LIGHT SENSOR

(75) Inventor: Federico Canini, Bologna (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/362,995

(22) Filed: Jul. 30, 1999

(30) Foreign Application Priority Data

Oct. 23, 1998 (EP) .................. 98830636

(51) Int. Cl.
H04N 5/235 (2006.01)
H04N 3/14 (2006.01)
H04N 5/335 (2006.01)
G03B 7/00 (2006.01)

(52) U.S. Cl. .................. 348/362; 348/229.1; 348/296; 396/236

(58) Field of Classification Search ................ 348/364, 348/221.1, 229.1, 296, 297, 298, 362, 363; 396/236
See application file for complete search history.

(56) References Cited

U.S. PATENT DOCUMENTS

| | | | | |
|---|---|---|---|---|
| 5,335,075 A * | 8/1994 | Komiya et al. | ............. | 348/298 |
| 5,448,293 A * | 9/1995 | Kogane et al. | ............ | 348/229.1 |
| 5,539,460 A * | 7/1996 | Tamura | .................... | 348/296 |
| 5,585,942 A * | 12/1996 | Kondo | ........................ | 358/474 |
| 5,734,426 A * | 3/1998 | Dong | ........................ | 348/297 |
| 5,745,808 A * | 4/1998 | Tintera | ....................... | 396/236 |
| 5,751,352 A | 5/1998 | Ogawa | | |
| 5,751,354 A * | 5/1998 | Suzuki et al. | ................ | 348/349 |
| 5,751,844 A * | 5/1998 | Bolin et al. | .................. | 382/156 |
| 6,320,615 B1 * | 11/2001 | Kim | ........................ | 348/229.1 |
| 6,362,848 B1 * | 3/2002 | Lohscheller et al. | ......... | 348/149 |
| 6,421,086 B1 * | 7/2002 | Kuno et al. | .................. | 348/312 |
| 6,486,915 B1 * | 11/2002 | Bell et al. | .................... | 348/362 |
| 6,621,987 B1 * | 9/2003 | Tsai et al. | .................... | 396/234 |
| 2001/0013903 A1 * | 8/2001 | Suzuki et al. | ................ | 348/362 |
| 2001/0035908 A1 * | 11/2001 | Kim | .......................... | 348/221 |
| 2002/0071049 A1 * | 6/2002 | Bell et al. | .................... | 348/364 |
| 2003/0086010 A1 * | 5/2003 | Luo et al. | .................... | 348/297 |
| 2003/0098914 A1 * | 5/2003 | Easwar | ........................ | 348/362 |
| 2003/0122939 A1 * | 7/2003 | Bell et al. | ................ | 348/229.1 |

* cited by examiner

Primary Examiner—Ngoc-Yen Vu
Assistant Examiner—John M. Villecco
(74) Attorney, Agent, or Firm—Nixon & Vanderhye, P.C.

(57) ABSTRACT

This invention relates to a process for regulating the exposure time of a light sensor, characterized in that it comprises the following steps:

a) setting the exposure time of the sensor to a value selected in a first range of M prefixed values defined between a minimum and a maximum value;

b) acquiring an image of an object on the sensor, such image comprising a plurality of luminous pixels;

c) analyzing the acquired image in order to detect its level of luminosity;

d) comparing the detected level of luminosity with a prefixed higher (lower) global threshold level representative of a condition of overexposure (under-exposure) of the image;

e) varying the exposure time of the sensor and iteratively repeating the previous steps until an optimum exposure time equal to the highest (lowest) exposure time is found, amongst the ones set, for which the image presents a level of luminosity which is smaller (greater) than the prefixed higher (lower) global threshold level.

25 Claims, 6 Drawing Sheets

PROCESS FOR REGULATING THE EXPOSURE TIME OF A LIGHT SENSOR

BACKGROUND OF THE INVENTION

1. Field of the Invention

The present invention relates to a process for regulating the exposure time of a light sensor. More particularly, the invention relates to a process for regulating the exposure time of a light sensor according to the variation of luminosity in the work environment in which the sensor is located.

2. Discussion of the Prior Art

Throughout the present description and the attached claims, with the term: "light sensor", it is intended to indicate a light-sensitive optical element capable of converting a light signal, contained in a incident light beam, in an analogic electrical signal proportional to the light intensity of the light itself. In particular, the light sensor transforms the light image of an illuminated object into an electronic image thereof, in order to allow the carrying out of further operations of image processing, such as for example those connected to the reading of an optical code located on the object.

In the following, reference to light sensors of known type will be made, for example CCD or CMOS sensors, both linear and of matrix type.

As is known, a drawback associated with light sensors at present available on the market is correlated to the fact that their operation is strongly influenced by the variations in luminosity of the surface on which the image to be acquired is to be found (such surface can be more or less clear and more or less illuminated). In particular, the resolution of the image acquired by the sensor (that is the richness of details detected in the image acquired by it) considerably varies according to the variation of the luminosity of the surrounding environment and of the surface to be acquired: highly illuminated environments can as such create conditions of strong overexposure or saturation (little contrast) of the image on the sensor, whilst badly illuminated environments can create conditions of strong under-exposure (excessive dark) in the image on the sensor. In both cases, the image acquired by the sensor appears badly exposed and not very clear, therefore making it impossible to detect details having small sizes.

In particular, with reference to the reading of an optical code, the acquisition on the sensor of an image of an optical code having a low resolution is often undesired because it renders the subsequent operations of localization, reading and decoding of the code itself very approximate and rough; this is absolutely unacceptable where it is necessary to carry out a correct decoding of the code in order to unequivocally identify the object having the code thereon.

The drawbacks associated with the acquisition of an image having low resolution can be overcome by suitably regulating the exposure time of the sensor according to the variations of luminosity of the surrounding work environment and of the surface to be acquired. In particular, where an increase in luminosity occurs in the work environment, it would be advisable to set a shorter exposure time on the sensor, in order to avoid the risk of generating conditions of saturation of the acquired image; viceversa, in the case where a decrease in luminosity occurs in the work environment, it would be advisable to set a higher exposure time on the sensor, in order to avoid the risk of generating conditions of under-exposure of the acquired image.

The majority of light sensors at present available on the market allow to set an exposure time by choosing it between a range of values, more or less extensive, each differing the one from the other by descrete amounts; such values are stated by the manufacturers of the sensors.

SUMMARY OF THE INVENTION

The technical problem at the basis of this invention is that of making available a process which is able to carry out, automatically, an optimal regulation of the exposure time of a light sensor according to the variations of environmental luminosity conditions, so that the image acquired by the sensor is at the same time rich in details (that is, it is well exposed) and not saturated.

The present invention therefore relates to a process for regulating the exposure time of a light sensor, characterized in that it comprises the following steps:

a) setting the exposure time of the sensor to a value selected in a first range of M prefixed values defined between a minimum value and a maximum value;

b) acquiring the image of an object onto the sensor, such image comprising a plurality of luminous pixels;

c) analyzing the image acquired for detecting the level of luminosity of the same;

d) comparing the detected level of luminosity with a prefixed higher (lower) global threshold level representative of a condition of overexposure (under-exposure) of the image;

e) varying the exposure time of the sensor and iteratively repeating the previous steps until an optimum exposure time equal to a higher (lower) exposure time is found, among the ones set, for which the image presents a level of luminosity smaller (greater) than the prefixed higher (lower) global threshold level.

We are talking therefore about a process for selecting an exposure time which is thought to be optimum, and that is which avoids conditions of strong saturation of the image on the sensor in the presence of an increase of the environmental light and, at the same time, conditions of under-exposure of the image in the presence of a decrease of environmental light. Advantageously, finding the right exposure time occurs by successive approximation, each time evaluating whether the image presents an undesired characteristic which results to be too much elevated (such as for example the excessive saturation or under-exposure) and suitably varying the exposure time of the sensor so as not to provoke the arise of such characteristic; it is therefore possible to regulate in real time the light sensor according to the variations of luminosity of the surrounding environmental and of the surface to be acquired.

More in particular, where the characteristic evaluated is the excessive saturation, the optimum exposure time found is, advantageously, the maximum possible exposure time compatible with the absence of conditions of saturation of the image; this allows to assure an elevated resolution of the image acquired on the sensor, without provoking its saturation.

In alternative, where the characteristic evaluated is the excessive under-exposure, the optimum exposure time found is, advantageously, the minimum possible exposure time compatible with the absence of conditions of under-exposure of the image; this allows to avoid the risk of having, on one side, images which are too dark and without details and, on the other side, blurred images (for example, in the case in which the reader is of a portable or manual type).

The duration of the process depends on the number of values of exposure time which the sensor can assume.

Advantageously, from this set of values a smaller range of M values is chosen, which are thought to be particularly interesting; this allows the end of the process of determination of the optimum exposure time of the sensor to be reached quicker.

In accordance with the invention, step d) of comparison between the detected level of luminosity and the prefixed higher (lower) global threshold level comprises the following steps:

d1) verifying if the level of luminosity of the acquired image is greater (smaller) than the prefixed higher (lower) global threshold level, and:
  d11) if such verification has a positive result, decreasing (increasing) the exposure time of the sensor and iteratively repeating the previous steps starting from b) until an optimum exposure time is found when, alternatively:
    d11a) the value of the exposure time set is the minimum (maximum) of the range of prefixed values;
    d11b) the value of the exposure time set is such that the image presents a level of luminosity smaller (greater) than the prefixed higher (lower) global threshold level.

On the contrary, if the verification of step d1) has a negative result, the following steps are carried out:

d12) increasing (decreasing) the exposure time of the sensor and iteratively repeating the previous steps starting from b) until an optimum exposure time is found when, alternatively:
  d12a) the value of the exposure time set is the maximum (minimum) of the range of prefixed values;
  d12b) the value of the exposure time set is such that the image presents a level of luminosity smaller (greater) than the prefixed higher (lower) global threshold level.

The estimation of the presence or not of conditions of saturation or under-exposure occurs therefore by means of a simple and fast algorithm of calculation, based on a simple comparison with the prefixed global threshold level.

Preferably, step c) of analyzing the image for detecting the level of luminosity of the same comprises the following steps:

c1) generating a signal representative of the level of luminosity of each pixel of the image acquired by the sensor;
c2) verifying subsequently if the signal generated in correspondence of a current pixel is greater (smaller) than a prefixed higher (lower) local threshold level representative of a condition of overexposure (under-exposure) of the analyzed pixel, and;
  c21) if such verification has a positive result, accumulating the contribution of each current pixel and iteratively repeating the previous steps starting from c2) for the following pixels;
  c22) if such verification has a negative result, releasing the current pixel and iteratively repeating the previous steps starting from c2) for the following pixels;
c3) verifying if the sum of the contributions accumulated is greater (smaller) than the prefixed higher (lower) global threshold level of the image, in such case carrying out step e), otherwise repeating the previous steps starting from c2).

Advantageously, the above mentioned steps allows to make the process of the invention reliable and robust. In fact, the evaluation of the level of saturation (under-exposure) of the image is independent from the characteristics of luminosity of smallest regions (pixels) of the image; on the contrary it happens on the basis of the contributions of all of the saturating pixels. This allows to avoid the risk of evaluating the level of exposure of all the image according to the level of exposure of a small portion of it; such risk would mean the setting of exposure times which would be such that they lead to an acquisition of undecodable images, in which, for example, the region containing the optical code to be read would be immersed in the darkness while the small saturating portions (due to reflections, luminous spots etc. . . . .) would be uselessly well exposed.

Preferably, step c) of analyzing the image acquired by the sensor comprises, in turn, the following steps:

ci) analyzing, in a period of time "n", the image acquired by the sensor exposed with an exposure time $T_{n-1}$ set in the time "n−1";
cii) setting, in the time "n", a new exposure time $T_n$ in order to acquire on the sensor an image which is destined to be analyzed in the time "n+1" and proceeding with steps d) and e);
ciii) iteratively repeating the previous steps starting from c1).

A typical characteristic of sensors is that of presenting a certain delay between the time in which the exposure time is set and the time in which the image acquired by means of such setting can be analyzed; this results in a lengthening of the time necessary for determining the correct exposure. Advantageously, the setting of a new exposure time during the analysis of the image acquired with the previously set exposure time allows, hence, to minimize the time needed for determining the optimum exposure time of the sensor.

Preferably, the value of the new exposure time $T_n$ set in step cii) is greater (smaller) than the value $_{n-1}$ previously set. In fact, such setting simply has a predictive meaning, which could therefore be right or wrong.

Where the characteristic evaluated is the excessive saturation, the times set in all of the predictions are longer than that previously set, trusting that the analysis of the image does not cause saturation; if such prediction comes true, the image will be validly exposed to a correct exposure time, otherwise it would be necessary to decrease the exposure time of the sensor.

In a very similar way, where the characteristic evaluated is the excessive under-exposure, the times set in all of the predictions are shorter than that previously set, trusting that the analysis of the image does not cause under-exposure; if such prediction comes true, the image will be validly exposed to a correct exposition time, otherwise it will be necessary to increase the exposition time of the sensor.

Preferably, once the optimum exposure time has been found, the following steps are carried out:

f) defining a second range of values of exposure time comprising Q prefixed values between a new minimum value and a new maximum value found among the M values of the first range of values and close to the value of the optimum exposure time previously found;
g) repeating the previous steps starting from a) until a new optimum exposure time is found;
h) iteratively repeating the previous steps starting from f), each time defining ranges of values of exposure times shorter and shorter, which are close to the optimum exposure times previously found.

It is therefore possible, mainly when there is time available for determining the optimum exposure time, to reiterate at will the process of the invention with the objective of searching the most accurate optimum exposure time. The number of reiterations carried out depends on the time one has available.

In accordance with a preferred embodiment of the process of the present invention, the time necessary for finding the optimum exposure time can be notably reduced if the analysis of the image acquired by the sensor is carried out only on a limited portion of the image itself. It is therefore possible, in equal time, to carry out several reiterations of the process of the invention, so obtaining ever more accurate exposure of the image acquired by the sensor.

BRIEF DESCRIPTION OF THE DRAWINGS

Further features and advantages of the process of the present invention will be more clearly apparent from the following detailed description of some preferred embodiments, with reference to the attached drawings. In such drawings.

DETAILED DISCUSSION OF THE PREFERRED EMBODIMENTS

Figure 1:
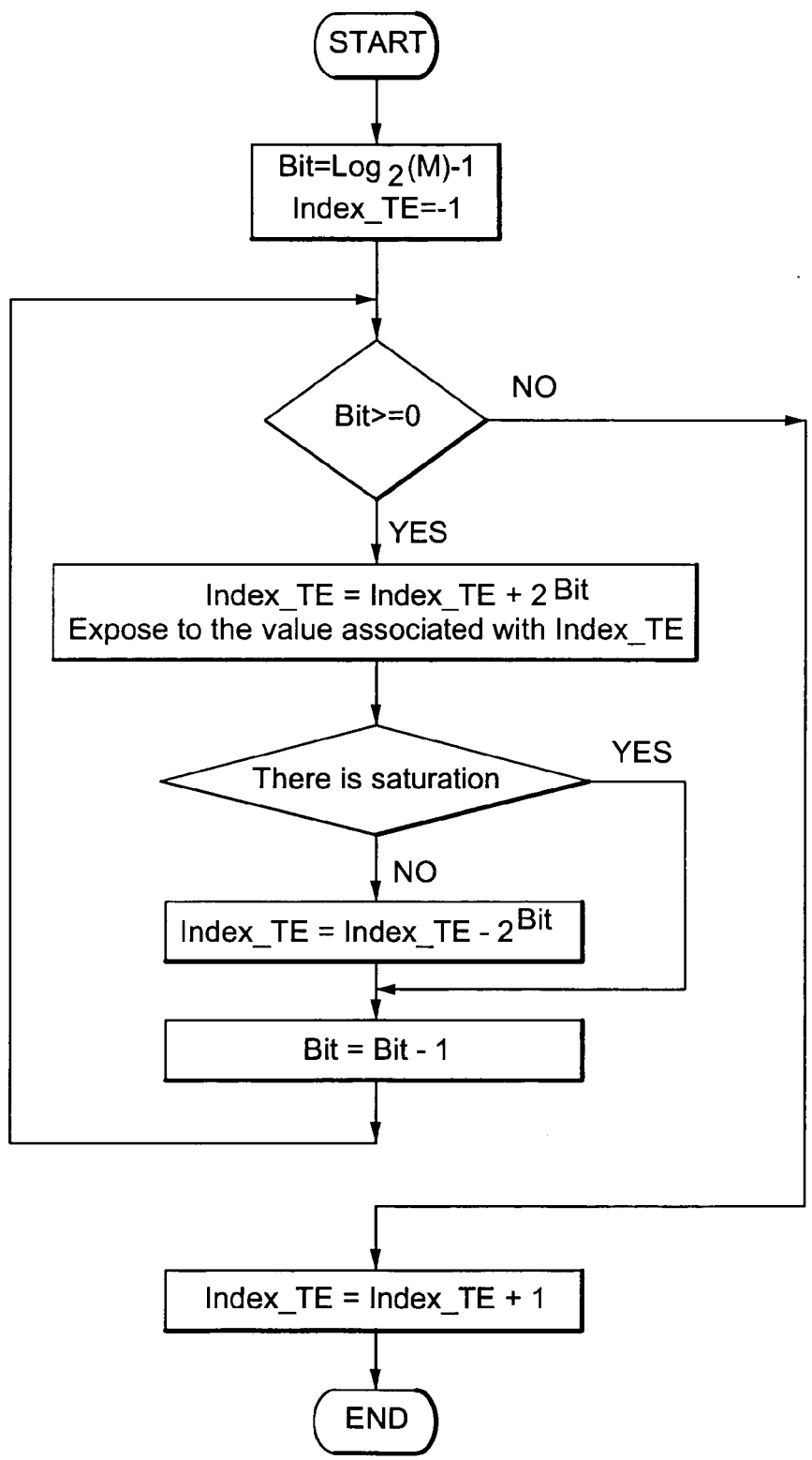
FIG. 1 shows a flow diagram of a first embodiment of the process of the present invention.

The process of the invention allows, by successive approximations, the determination of an optimum exposure time according to the variations of luminosity of the surface on which the image to be acquired is to be found and of the environment in which the light sensor is located (for example, a CCD or CMOS sensor, whether linear or of matrix type).

The process begins with the setting of an initial exposure time in the sensor equal to a value chosen in a first range of M prefixed values which are defined between a minimum value and a maximum value. Advantageously, the M values are a subset, thought to be particularly interesting, of the whole of the settable values of exposure times for the sensor in question and are stated by the manufacturer. In the examples shown in the figures attached, the values of exposure time chosen are eight and are, in fractions of a second: 1/30, 1/60, 1/125, 1/250, 1/500, 1/1000, 1/2000, 1/4000.

Once an initial exposure time is set, an image of an illuminated object is acquired by the sensor, for example, an object with an optical code to be read. Such image is analyzed by means of a simple algorithm of calculation in order to determine its level of luminosity and compare it with a prefixed higher or lower global threshold level, representative of an undesired characteristic of the image, for example, a condition of overexposure (saturation) or under-exposure of the image on the sensor.

In particular, on the basis of the result of the above mentioned comparison, the exposure time is regulated on a suitable chosen different value and the process is reiterated so as to find, after a certain number of reiterations, an optimum exposure time.

The logic of the research of the optimum exposure time carried out by the algorithm of calculation of the invention is that of finding, by successive approximations, the exposure time for which the presence of the undesired condition is manifested and, subsequently, of setting as optimum time the value of time more closer to that found, for which the acquired image does not present the undesired characteristic.

More in particular, where the chosen global threshold level is a signal representative of a condition of excessive overexposure (saturation) of the image acquired by the sensor, the algorithm will verify at each reiteration if the level of luminosity of the acquired image is greater than said threshold level (in this case it will be a higher threshold level). If such check has a positive result, this means that the image on the sensor exposed with that determined exposure time will be overexposed, for which therefore a smaller exposure time should be set and the comparison is iteratively repeated for the new exposure time set. The reiteration of the process continues in its search for the optimum exposure time and stops when the exposure time set is the highest, amongst the ones set in the various iterations, for which the image presents a level of luminosity smaller than the pre-fixed higher global threshold level or, alternatively, when the value of the exposure time set is the minimum within the range of M prefixed values.

If on the other hand the check has a negative result, this means that the image on the sensor exposed with that determined exposure time is not overexposed, and so a greater exposure time is set and the comparison is iteratively repeated for the new exposure time set. The reiteration of the process continues in its search for the optimum exposure time and stops when the exposure time set is the highest, amongst the ones set in the various iterations, for which the image presents a level of luminosity smaller than that of the prefixed higher global threshold level or, alternatively, when the value of the exposure time set is the maximum value within the range of M prefixed values.

Figure 2:
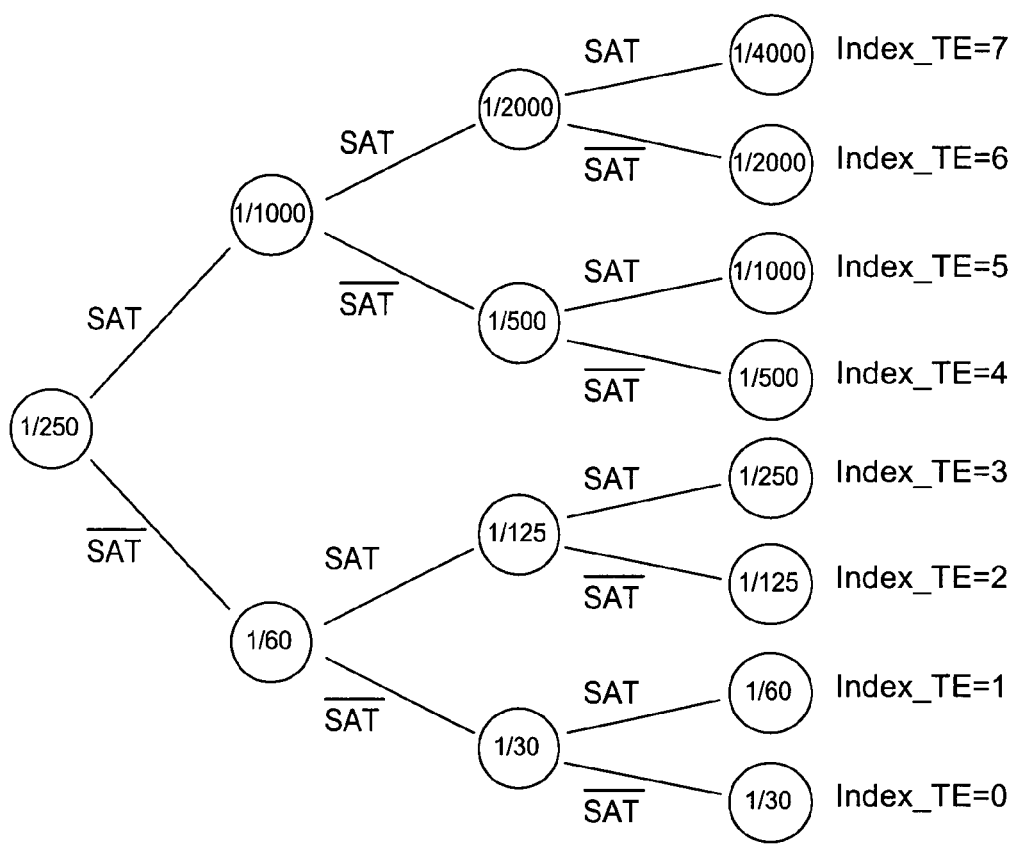
FIG. 2 shows a flow diagram relative to a numeric example of the process represented in FIG. 1.

FIG. 2 shows an example of embodiment of the above disclosed method. In such figure with SAT is indicated the presence of saturation, while $\overline{SAT}$ indicates the absence of saturation. Note how the algorithm allows to determine the optimum exposure time in four iterations and such time is the longest possible exposure time compatible with non-saturation of the image.

FIG. 1 shows an illustrative flow diagram of the process above described. At each prefixed exposure time is associated an index (index_TE) which is variable from 0 to M−1 respectively (the index 0 is associated to the longest exposure time, while the index M−1 is associated to the shortest exposure time), where M is to the power of 2 and is equal to the number of values of prefixed exposure time (in the examples shown M=8).

Figure 4:
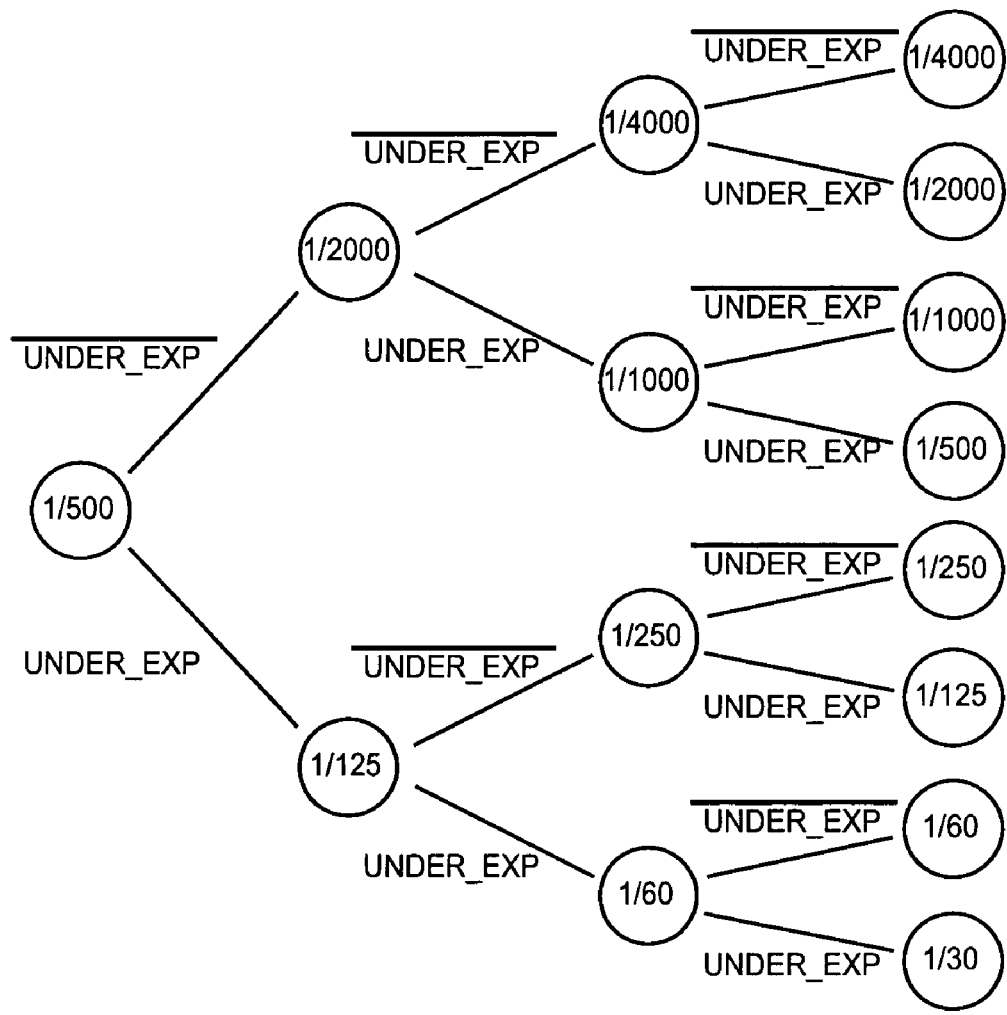
FIG. 4 shows a flow diagram relative to a numeric example of a second embodiment of the process of the present invention.
Figure 5:
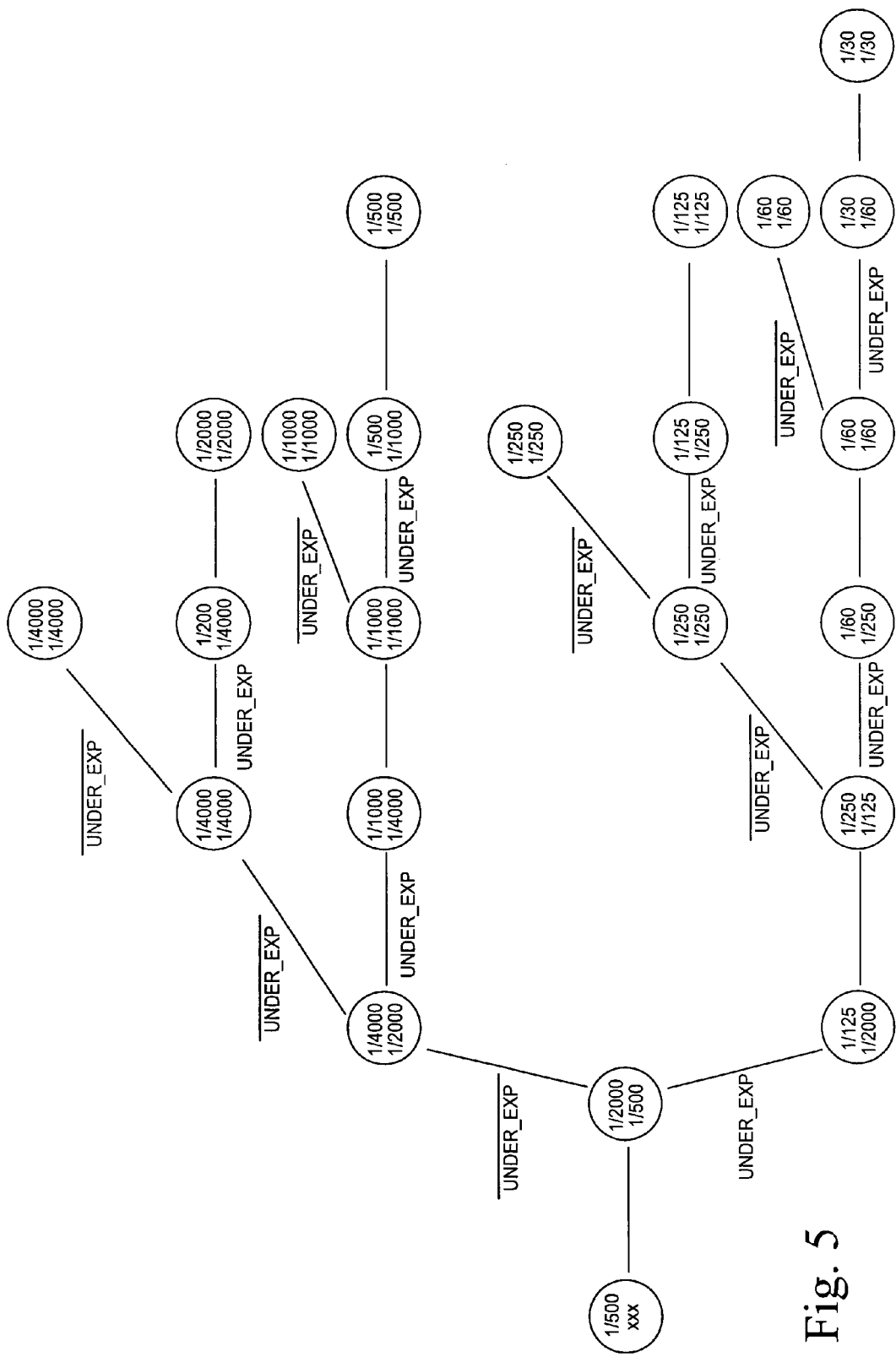
FIG. 5 shows a flow diagram relative to a numeric example of a preferred embodiment of the process represented in FIG. 4.

The above considerations are applicable in dual mode to the case in which the chosen global threshold level is a signal representative of a condition of excessive under-exposure of the image acquired by the sensor (see FIG. 4). In such case, at each iteration a check of whether the level of luminosity of the acquired image is smaller than the said threshold level (this time it will be a lower threshold level). If such check has a positive result, this means that the image on the sensor exposed with that determined exposure time is underexposed, for which a greater exposure time is set and the comparison is iteratively repeated for the new exposure time set. The reiteration of the process continues in its search for the optimum exposure time and stops when the exposure time set is the lowest, amongst the ones set in the various iterations, for which the image presents a level of luminosity greater than the prefixed lower global threshold level or, alternatively, when the value of the exposure time set is the maximum value of the range of M prefixed values.

If, on the other hand the above check has a negative result, this means that the image on the sensor exposed with that determined exposure time is not underexposed, and so a lower exposure time is set and the comparison is iteratively repeated for the new exposure time set. The reiteration of the process continues in its search for the optimum exposure time and stops when the exposure time set is the lowest, amongst the ones set in the various iterations, for which the image presents a level of luminosity smaller than the prefixed higher global threshold level or, alternatively, when the value of the exposure time set is the minimum value of the range of M prefixed values.

FIG. 4 shows an example of embodiment of the above mentioned method. In such figure with UNDER EXP is indicated the presence of under-exposure, while with $\overline{\text{UNDEREXP}}$ is indicated the absence of under-exposure. Note how also in this case the algorithm allows to determine the optimum exposure time in four iterations and such time is the shortest exposure time possible compatible with the non-underexposure of the image.

With the objective of making the process of the invention reliable and robust, the evaluation of the level of saturation (or under-exposure) of the image occurs by analyzing the levels of luminosity of a plurality of pixels forming said image. In particular, the analysis of the luminous image includes first of all the generation of a representative signal of the level of luminosity of each of the pixels which form the above mentioned image and, subsequently, a comparison of the luminosity of the single pixels with a prefixed local threshold level representative of a condition of saturation (or under-exposure) of the same pixels. Each time the signal representative of the pixel currently analyzed is found to be greater (smaller) than the prefixed local threshold level, the contribution of such pixel is accumulated on a storing element and the next pixel is analyzed until the sum of contributions stored exceeds the prefixed global threshold level. Otherwise, if after having analyzed all the pixels of the image the global threshold is not exceeded, it is considered that there is not saturation (or under-exposure).

Figure 6:
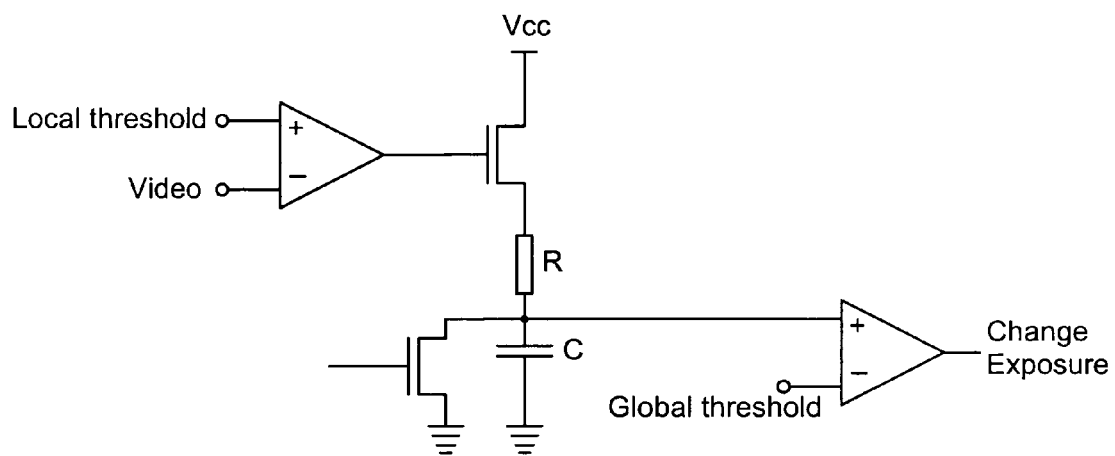
FIG. 6 schematically shows a circuit for the generation of a comparison signal used in the process of the present invention.

FIG. 6 shows a circuit for the generation of a signal destined to control the change of exposure time because of the presence of excessive saturation or under-exposure. Essentially this includes two comparative circuits comprising a generator of voltage Vcc, a resistance R and a condenser C destined to accumulating a determined charge each time there is saturation of a pixel. In this figure, with VIDEO is indicated a electric signal proportional to the level of luminosity of the current pixel, and with global_threshold the electric signal proportional to the undesired threshold level of luminosity of the entire image are respectively indicated.

The VIDEO signal of each single pixel is compared to the prefixed local threshold level and, each time such VIDEO signal is greater than said undesired local threshold level, a charge is accumulated in the condenser C. When the voltage at the ends of the condenser exceeds the undesired global threshold level, the SAT (or UNDER EXP) signal is generated which indicates the presence of excessive saturation (or under-exposure) in the image and, therefore, the necessity of setting a different exposure time. Each time a different exposure time is set the charge accumulated in the condenser C is reset for proceeding to the analysis of the acquired image with the new exposure time having just been set.

The sizing of the resistance R and of the condenser C and the choice of the global threshold level mean that there is saturation (or under-exposure) only when a certain percentage of pixels of the image go into saturation (or under-exposure). Therefore, once R and C are fixed, by varying the global threshold level the percentage of pixels which must saturate (or which must be underexposed) for bringing to a reduction (or in the case of under-exposure an increase) of the exposure time of the sensor is selected.

In an embodiment of the process of the present invention, the fact that all the sensors present a certain delay between the time in which the exposure time is set and the time in which the acquired image by means of such setting can be analyzed, should be taken into account. This means that the time which is necessary for the determination of the optimum exposure time is longer.

The process of the invention includes, advantageously, the setting of a new exposure time $T_n$ in a period of time "n" whilst the image acquired with the exposure time $T_{n-1}$ set in a previous period of time "n−1" is analyzed (see FIGS. 3 and 4, where in each circle, the value at the top indicates the exposure time currently set (the effect of which will be available in the following period), while the value at the bottom indicates the exposure time set in the previous period and currently analyzed).

As a consequence, the decision to change the exposure time of the sensor is taken in a determined period "n" analyzing the image acquired with an exposure time $T_{n-1}$ set in the previous period "n−1". In order to minimize the global time for determining the optimum exposure time, in such period "n" a new exposure time $T_n$ is set on the sensor destined to produce an image to be analyzed in a following period "n+1". The value of the new exposure time $T_n$ set has a meaning of simple prediction, which could be correct or wrong.

Where the characteristic evaluated is the excessive saturation, the times set in all of the predictions are longer times than that previously set, trusting that the analysis of the image does not cause saturation; if such prediction should come true, the image will be validly exposed to a correct exposure time, otherwise it will be necessary to decrease the exposure time of the sensor.

In a similar way, where the characteristic evaluated is the excessive under-exposure, the times set in all of the predictions are shorter times than that previously set, trusting that the analysis of the image does not cause under-exposure; if such prediction should come true, the image will be validly exposed to a correct exposure time, otherwise it will be necessary to increase the exposure time of the sensor.

Figure 3:
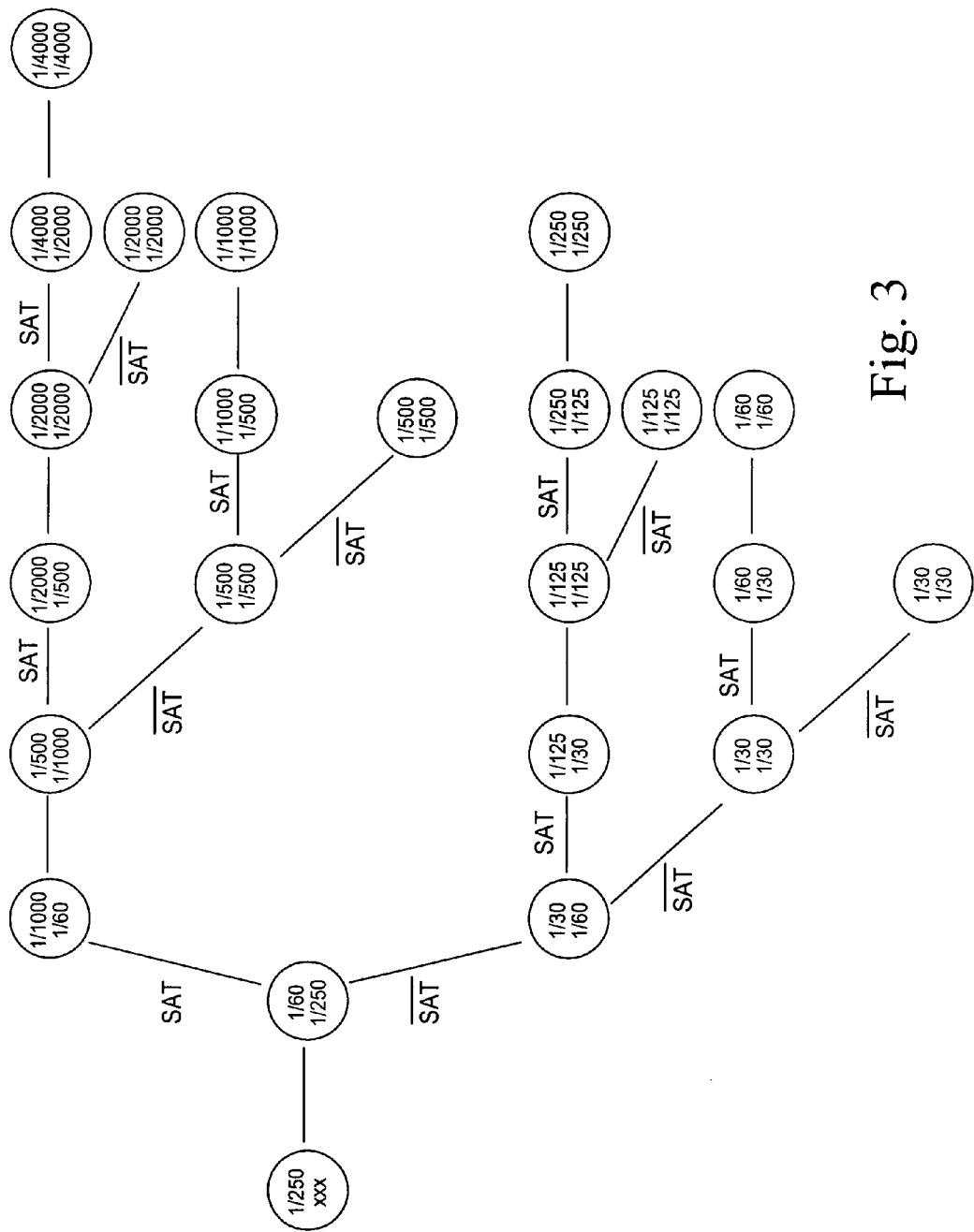
FIG. 3 shows a flow diagram relative to a numeric example of a preferred embodiment of the process in FIG. 1.

FIGS. 3 and 4 show with a thicker border the final stages of the process in which the optimum exposure times have been found. It is possible to note how, in the best case where the predictions are all correct, the final result is available after only four exposures, whilst in the worst case of all the predictions being wrong, eight are necessary; in all probability, it is possible to calculate that on average the determination of an optimum exposure time can be reached in six exposures.

In accordance with a preferred embodiment of the process of the present invention, if there is sufficient time available for the determination of optimum exposure time, it is possible, once an optimum exposure time among the M prefixed values has been found, to reiterate at will the process of searching for a new optimal exposure time which is more accurate. Such search is carried out by selecting a second range of Q prefixed values of exposure time between a new minimum value and a new maximum value and close to the optimum exposure time previously found.

For example, let us suppose that we have determined 1/500 (index_TE=4) as optimum exposure time amongst the eight values indicated above; it is possible then to define a new range of eight values of exposure time close to 1/500 among which we can search for a more accurate exposure time. For example, it is possible to select as new minimum value and new maximum value of the new range respectively 1/1000 and 1/250 and, similarly with the prefixed values for the first search, the new values of prefixed exposure time would be the following:

| Exposure time (s) | Associated index |
|---|---|
| 1/1000 | 7 |
| 1/750 | 6 |
| 1/625 | 5 |
| 1/500 | 4 |
| 1/437 | 3 |
| 1/375 | 2 |
| 1/312 | 1 |
| 1/250 | 0 |

This process can be reiterated at will according to the time available for obtaining a well exposed image.

The lengthening of the time for determining the optimum exposure time due to the reiteration of the process can be contained if, instead of analyzing the entire image in order to establish if saturation (or under-exposure) is present, such analysis is limited to a limited portion of the same.

The most sophisticated sensors in fact allow a portion of sensor dimensionable at will to be analyzed; the time of analysis of such portion depends on its size but in any case is smaller than that necessary for the analysis of the entire image. With such sensors it is therefore possible, in equal time, to carry out more iterations of the process of the invention, so obtaining an exposure of the acquired image from the sensor which is more and more accurate.

The invention claimed is:

1. A method for regulating the exposure time of a light sensor, said method comprising the steps of:
   a) setting the exposure time of the sensor to a value selected in a first range of values defined between a minimum value and a maximum value and comprising M prefixed values;
   b) acquiring an image of an object onto the sensor, said image comprising a plurality of pixels;
   c) analyzing the acquired image for the level of luminosity of said image;
   d) comparing the level of luminosity with a previously fixed higher global threshold level representative of a condition of overexposure of the image;
   e) independently of the result of the comparison of step d), performing a certain number of iterations wherein in each iteration the value of the exposure time of the sensor is varied and the previous steps are repeated until an optimum value of the exposure time is found, said optimum value of the exposure time being the highest value among those set values of the exposure time which are such that the corresponding acquired image presents a level of luminosity smaller than the global threshold level.

2. The method according to claim 1, wherein step d) of comparison between the detected level of luminosity and the global threshold level comprises the following steps:
   d1) verifying if the level of luminosity of the acquired image is greater than the global threshold level, and:
   d11) if such verification has a positive result, decreasing the exposure time of the sensor and iteratively repeating the previous steps starting from b) until an optimum exposure time is found when, alternatively:
   d11a) the value of the exposure time set is the minimum of the range of prefixed values;
   d11b) the value of the set exposure time is such that the image presents a level of luminosity smaller than the global threshold level.

3. The method according to claim 2, wherein, if the verification of step d1) has a negative result, the following steps are carried out:
   d12) increasing the exposure time of the sensor and iteratively repeating the previous steps starting from b) until an optimum exposure time is found when, alternatively:
   d12a) the value of the exposure time set is the maximum of the range of prefixed values;
   d12b) the value of the exposure time set is such that the image presents a level of luminosity smaller than the global threshold level.

4. The method according to claim 1, wherein step c) of analyzing the image for detecting its level of luminosity comprises the following steps:
   c1) generating a signal representative of the level of luminosity of each pixel of the image acquired by the sensor;
   c2) verifying subsequently if the signal generated in correspondence to a current pixel is greater than the global threshold level representative of a condition of overexposure of the analyzed pixel, and:
   c21) if such verification has a positive result, accumulating the contribution of the current pixel and iteratively repeating the previous steps starting from c2) for the following pixels;
   c22) if such verification has a negative result, releasing the current pixel and iteratively repeating the previous steps starting from c2) for the following pixels;
   c3) verifying if the sum of the contributions accumulated is greater than the global threshold level of the image, in such case carrying out step e), otherwise repeating the previous steps staring from c2).

5. The method according to claim 1, wherein step c) of analyzing the image acquired by the sensor comprises, in turn, the following steps:
   ci) analyzing, in a period of time "n", the image acquired by the sensor exposed with an exposure time $T_{n-1}$ set in the time "n−1";
   cii) setting, in the time "n", a new exposure time $T_n$ in order to acquire on the sensor an image which is destined to be analyzed in the time "n+1" and proceeding with steps d) and e);
   ciii) iteratively repeating the previous steps starting from c).

6. The method according to claim 5, wherein the value of the new exposure time $T_n$ set in step cii) is greater than the value $T_{n-1}$ previously set.

7. The method according to claim 1, wherein once the optimum exposure time has been found, the following steps are carried out:
   f) defining a second range of values of exposure time comprising Q prefixed values between a new minimum and a new maximum value found among the M values of the first range of values and close to the value of the optimum exposure time previously found;

g) repeating the previous steps starting from a) until a new optimum exposure is found;

h) iteratively repeating the previous steps starting from f), each time defining ranges shorter and shorter which are close to the optimum exposure time previously found.

8. The method according to claim 1, wherein the analysis of the image acquired by the sensor is carried out on a limited portion of the image itself.

9. A method of regulating the exposure time of a light sensor, said method comprising the steps of:

a) setting the exposure time of the sensor to a value selected in a first range of values defined between a minimum value and a maximum value and said first range comprising M prefixed values;

b) acquiring an image of an object onto the sensor, said image comprising a plurality of pixels;

c) analyzing the acquired image for the level of luminosity of said image;

d) comparing the analyzed level of luminosity with a prefixed higher or lower, respectively, global threshold level representative of a condition of overexposure or underexposure, respectively, of the image;

e) independently of the result of the comparison of step d), performing a certain number of iterations wherein in each iteration the value of the exposure time of the sensor is varied and the previous steps are repeated until an optimum value of the exposure time is found, said optimum value of the exposure time being the highest or the lowest, respectively among those set values of the exposure time which are such that the corresponding acquired images presents a level of luminosity smaller or greater, respectively, than the prefixed higher, or lower, respectively, global threshold level.

10. A method for regulating the exposure time of a light sensor, said method comprising the steps of:

a) setting the exposure time of the sensor to a value selected in a first range of values defined between a minimum value and a maximum value and comprising M prefixed values;

b) acquiring an image of an object onto the sensor, said image comprising a plurality of pixels;

c) analyzing the acquired image for the level of luminosity of said image;

d) comparing the level of luminosity with a previously fixed lower global threshold level representative of a condition of underexposure of the image;

e) independently of the result of the comparison of step d), performing a certain number of iterations wherein in each iteration the value of the exposure time of the sensor is varied and the previous steps are repeated until an optimum value of the exposure time is found, said optimum value of the exposure time being the lowest value among those set values of the exposure time which are such that the corresponding acquired images presents a level of luminosity greater than the global threshold level.

11. The method according to claim 10, wherein step d) of comparison between the detected level of luminosity and the lower global threshold level comprises the following steps:

d1) verifying if the level of luminosity of the acquired image is smaller than the global threshold level, and:

d11) if such verification has a positive result, increasing the exposure time of the sensor and iteratively repeating the previous steps starting from b) until an optimum exposure time is found when, alternatively:

d11a) the value of the exposure time set is the maximum of the range of prefixed values;

d11b) the value of the set exposure time is such that the image presents a level of luminosity greater than the global threshold level.

12. The method according to claim 11, wherein, if the verification of step d1) has a negative result, the following steps are carried out:

d12) decreasing the exposure time of the sensor and iteratively repeating the previous steps starting from b) until an optimum exposure time is found when, alternatively:

d12a) the value of the exposure time set is the minimum of the range of prefixed values;

d12b) the value of the exposure time set is such that the image presents a level of luminosity greater than the global threshold level.

13. The method according to claim 10, wherein step c) of analyzing the image for detecting its level of luminosity comprises the following steps:

c1) generating a sigal representative of the level of luminosity of each pixel of the image acquired by the sensor;

c2) verifying subsequently if the signal generated in correspondence to a current pixel is smaller than the global threshold level representative of a condition of underexposure of the analyzed pixel, and:

c21) if such verification has a positive result accumulating the contribution of the current pixel and iteratively repeating the previous steps starting from c2) for the following pixels;

c22) if such verification has a negative result, releasing the current pixel and iteratively repeating the previous steps starting from c2) for the following pixels;

c3) verifying if the sum of the contributions accumulated is smaller than the global threshold level of the image, in such case carrying out step e), otherwise repeating, the previous steps starting from c2).

14. The method according to claim 10, wherein step c) of analyzing the image acquired by the sensor comprises, in turn, the following steps:

ci) analyzing, in a period of time "n", the image acquired by the sensor exposed with an exposure time $T_{n-1}$ set in the time "n−1";

cii) setting, in the time "n", a new exposure time $T_n$ in order to acquire on the sensor an image which is destined to be analyzed in the time "n+1" and proceeding with steps d) and e);

ciii) iteratively repeating the previous steps stag from c).

15. The method according to claim 14, wherein the value of the new exposure time $T_n$ set in step cii) is smaller than the value $T_{n-1}$ previously set.

16. The method according to claim 10, wherein once the optimum exposure time has been found, the following steps are carries out:

f) defining a second range of values of exposure time comprising Q prefixed values between a new minimum and a new maximum value found among the M values of the first range of values and close to the value of the optimum exposure time previously found;

g) repeating the previous steps starting from a) until a new optimum exposure time is found;

h) iteratively repeating the previous steps starting from f), each time defining ranges shorter and shorter which are close to the optimum exposure time previously found.

17. The method according to claim 10, wherein the analysis of the image acquired by the sensor is carried out on a limited portion of the image itself.

18. A method of regulating the exposure time of a light sensor, said method comprising the steps of:
a) setting the exposure time of the sensor to a value selected in a first range of values defined between a minimum value and a maximum value and comprising M prefixed values;
b) acquiring an image of an object onto the sensor, said image comprising a plurality of pixels;
c) analyzing the acquired image for the level of luminosity of said image by:
  c1) generating a signal representative of the level of luminosity of each pixel of the image acquired by the sensor;
  c2) verifying subsequently if the signal generated in correspondence to a current pixel is greater than the global threshold level representative of a condition of overexposure of the analyzed pixel, and:
    c21) if such verification has a positive result, accumulating the contribution of the current pixel and iteratively repeating the previous steps starting from c2) for the following pixels;
    c22) if such verification has a negative result, releasing the current pixel and iteratively repeating the previous steps starting from c2) for the following pixels;
  c3) verifying if the sum of the contributions accumulated is greater than the global threshold level of the image, in such case carrying out step e), otherwise repeating the previous steps starting from c2);
d) comparing the analyzed level of luminosity with a previously fixed higher global threshold level representative of a condition of overexposure of the image, comprising the steps of:
  d1) verifying if the level of luminosity of the acquired image is greater than the global threshold level, wherein;
    d11) if such verification has a positive result, decreasing the exposure time of the sensor and iteratively repeating the previous steps starting from b) until an optimum exposure time is found when, alternatively;
    d11a) the value of the exposure time set is the minimum of the range of prefixed values;
    d11b) the value of the set exposure time is such that the image presents a level of luminosity smaller than the global threshold level; and
    d12) if such verification has a negative result, increasing the exposure time of the sensor and iteratively repeating the previous steps starting from b) until an optimum exposure time is found when, alternatively:
    d12a) the value of the exposure time set is the maximum of the range of prefixed values;
    d12b) the value of the exposure time set is such that the image presents a level of luminosity smaller than the global threshold level; and
e) varying the exposure time of the sensor and iteratively repeating the previous steps until an optimum exposure time equal to a higher exposure time is found, among the ones set, for which the image presents a level of luminosity smaller than the global threshold level.

19. A method of regulating the exposure time of a light sensor, said method comprising the steps of:
a) setting the exposure time of the sensor to a value selected in a first range of values defined between a minimum value and a maximum value and comprising M prefixed values;
b) acquiring an image of an object onto the sensor, said image comprising a plurality of pixels;
c) analyzing the acquired image for the level of luminosity of said image, comprising the steps of:
  c1) generating a signal representative of the level of luminosity of each pixel of the image acquired by the sensor;
  c2) verifying subsequently if the sigal generated in correspondence to a current pixel is smaller than the global threshold level representative of a condition of underexposure of the analyzed pixel, and:
    c21) if such verification has a positive result, accumulating the contribution of the current pixel and iteratively repeating the previous steps staring from c2) for the following pixels;
    c22) if such verification has a negative result, releasing the current pixel and iteratively repeating the previous steps starting from c2) for the following pixels;
  c3) verifying if the sum of the contributions accumulate is smaller than the global threshold level of the image, in such case carrying out step e), otherwise repeating the previous steps starting from c2);
d) comparing the analyzed level of luminosity with a previously fixed lower global threshold level representative of a condition of underexposure of the image, comprising the steps of:
  d1) verifying if the level of luminosity of the acquired image is smaller than the global threshold level, wherein:
    d11) if such verification has a positive result, increasing the exposure time of the sensor and iteratively repeating the previous steps starting from b) until an optimum exposure time is found when, alternatively:
    d11a) the value of the exposure time set is the maximum of the range of prefixed values;
    d11b) the value of the set exposure time is such that the image if the verification of step d1) has a negative result, the following steps are carried out:
    d12) if such verification has a negative result, decreasing the exposure time of the sensor and iteratively repeating the previous steps starting from b) until an optimum exposure time is found when, alternatively:
    d12a) the value of the exposure time set is the minimum of the range of prefixed values;
    d12b) the value of the exposure time set is such that the image presents a level of luminosity greater than the global threshold level; and
e) varying the exposure time of the sensor and iteratively repeating the previous steps until an optimum exposure time equal to a lower exposure time is found, among the ones set, for which the image presents a level of luminosity greater than the global threshold level.

20. A method for regulating the exposure time of a light sensor, said method comprising the steps of:
a) setting the exposure time of the sensor to a value selected in a first range of values defined between a minimum value and a maximum value and comprising M prefixed values;
b) acquiring an image of an object onto the sensor, said image comprising a plurality of pixels;

c) analyzing the acquired image for the level of luminosity of said image;

d) comparing the level of luminosity with a previously fixed higher global threshold level representative of a condition of overexposure of the image;

e) performing a certain number of iterations wherein in each iteration the exposure time of the sensor is varied and the previous steps are repeated until an optimum exposure time is found, said optimum exposure time being the highest among the ones set for which the image presents a level of luminosity smaller than the global threshold level;

wherein step d) of comparison between the detected level of luminosity and the global threshold level comprises the following steps:

d1) verifying if the level of luminosity of the acquired image is greater than the global threshold level, and:

d11) if such verification has a positive result, decreasing the exposure time of the sensor and iteratively repeating the previous steps starting from b) until an optimum exposure time is found when, alternatively:

d11a) the value of the exposure time set is the minimum of the range of prefixed values;

d11b) the value of the set exposure time is such that the image presents a level of luminosity smaller than the global threshold level;

wherein, if the verification of step d1) has a negative result, the following steps are carried out:

d12) increasing the exposure time of the sensor and iteratively repeating the previous steps starting from b) until an optimum exposure time is found when, alternatively:

d12a) the value of the exposure time set is the maximum of the range of prefixed values;

d12b) the value of the exposure time set is such that the image presents a level of luminosity smaller than the global threshold level.

21. A method for regulating the exposure time of a light sensor, said method comprising the steps of:

a) setting the exposure time of the sensor to a value selected in a first range of values defined between a minimum value and a maximum value and comprising M prefixed values;

b) acquiring an image of an object onto the sensor, said image comprising a plurality of pixels;

c) analyzing the acquired image for the level of luminosity of said image;

d) comparing the level of luminosity with a previously fixed higher global threshold level representative of a condition of overexposure of the image;

e) performing a certain number of iterations wherein in each iteration the exposure time of the sensor is varied and the previous steps are repeated until an optimum exposure time is found, said optimum exposure time being the highest among the ones set for which the image presents a level of luminosity smaller than the global threshold level;

wherein step c) of analyzing the image for detecting its level of luminosity comprises the following steps:

c1) generating a signal representative of the level of luminosity of each pixel of the image acquired by the sensor;

c2) verifying subsequently if the signal generated in correspondence to a current pixel is greater than the global threshold level representative of a condition of overexposure of the analyzed pixel, and:

c21) if such verification has a positive result, accumulating the contribution of the current pixel and iteratively repeating the previous steps starting from c2) for the following pixels;

c22) if such verification has a negative result, releasing the current pixel and iteratively repeating the previous steps starting from c2) for the following pixels;

c3) verifying if the sum of the contributions accumulated is greater than the global threshold level of the image, in such case carrying out step e), otherwise repeating the previous steps starting from c2).

22. A method for regulating the exposure time of a light sensor, said method comprising the steps of:

a) setting the exposure time of the sensor to a value selected in a first range of values defined between a minimum value and a maximum value and comprising M prefixed values;

b) acquiring an image of an object onto the sensor, said image comprising a plurality of pixels;

c) analyzing the acquired image for the level of luminosity of said image;

d) comparing the level of luminosity with a previously fixed higher global threshold level representative of a condition of overexposure of the image;

e) performing a certain number of iterations wherein in each iteration the exposure time of the sensor is varied and the previous steps are repeated until an optimum exposure time is found, said optimum exposure time being the highest among the ones set for which the image presents a level of luminosity smaller than the global threshold level; wherein once the optimum exposure time has been found, the following steps are carried out:

f) defining a second range of values of exposure time comprising Q prefixed values between a new minimum and a new maximum value found among the M values of the first range of values and close to the value of the optimum exposure time previously found;

g) repeating the previous steps starting from a) until a new optimum exposure is found;

h) iteratively repeating the previous steps starting from f), each time defining ranges shorter and shorter which are close to the optimum exposure time previously found.

23. A method for regulating the exposure time of a light sensor, said method comprising the steps of:

a) setting the exposure time of the sensor to a value selected in a first range of values defined between a minimum value and a maximum value and comprising M prefixed values;

b) acquiring an image of an object onto the sensor, said image comprising a plurality of pixels;

c) analyzing the acquired image for the level of luminosity of said image;

d) comparing the level of luminosity with a previously fixed lower global threshold level representative of a condition of underexposure of the image;

e) performing a certain number of iterations wherein in each iteration the exposure time of the sensor is varied and the previous steps are repeated until an optimum exposure time is found, said optimum exposure time being the lowest among the ones set for which the image presents a level of luminosity greater than the global threshold level, wherein step d) of comparison between the detected level of luminosity and the lower global threshold level comprises the following steps:

d1) verifying if the level of luminosity of the acquired image is smaller than the global threshold level, and:

d11) if such verification has a positive result, increasing the exposure time of the sensor and iteratively repeating the previous steps starting from b) until an optimum exposure time is found when, alternatively:

d11a) the value of the exposure time set is the maximum of the range of prefixed values;

d11b) the value of the set exposure time is such that the image presents a level of luminosity greater than the global threshold level;

wherein, if the verification of step d1) has a negative result, the following steps are carried out:

d12) decreasing the exposure time of the sensor and iteratively repeating the previous steps starting from b) until an optimum exposure time is found when, alternatively:

d12a) the value of the exposure time set is the minimum of the range of prefixed values;

d12b) the value of the exposure time set is such that the image presents a level of luminosity greater than the global threshold level.

24. A method for regulating the exposure time of a light sensor, said method comprising the steps of:

a) set the exposure time of the sensor to a value selected in a first range of values defined between a minimum value and a maximum value and comprising M prefixed values;

b) acquiring an image of an object onto the sensor, said image comprising a plurality of pixels;

c) analyzing the acquired image for the level of luminosity of said image;

d) comparing the level of luminosity with a previously fixed lower global threshold level representative of a condition of underexposure of the image;

e) performing a certain number of iterations wherein in each iteration the exposure time of the sensor is varied and the previous steps are repeated until an optimum exposure time is found, said optimum exposure time being the lowest among the ones set for which the image presents a level of luminosity greater than the global threshold level;

wherein step c) of analyzing the image for detecting its level of luminosity comprises the following steps:

c1) generating a signal representative of the level of luminosity of each pixel of the image acquired by the sensor;

c2) verifying subsequently if the signal generated in correspondence to a current pixel is smaller than the global threshold level representative of a condition of underexposure of the analyzed pixel, and:

c21) if such verification has a positive result, accumulating the contribution of the current pixel and iteratively repeating the previous steps staring from c2) for the following pixels;

c22) if such verification has a negative result, releasing the current pixel and iteratively repeating the previous steps starting from c2) for the following pixels;

c3) verifying if the sum of the contributions accumulated is smaller than the global threshold level of the image, in such case carrying out step e), other se repeating the previous steps staring from c2).

25. A method for regulating the exposure time of a light sensor, said method comprising the steps of:

a) setting the exposure time of the sensor to a value selected in a first range of values defined between a minimum value and a maximum value and comprising M prefixed values;

b) acquiring an image of an object onto the sensor, said image comprising a plurality of pixels;

c) analyzing the acquired image for the level of luminosity of said image;

d) comparing the level of luminosity with a previously fixed lower global threshold level representative of a condition of underexposure of the image;

e) performing a certain number of iterations wherein in each iteration the exposure time of the sensor is varied and the previous steps are repeated until an optimum exposure time is found, said optimum exposure time being the lowest among the ones set for which the image presents a level of luminosity greater than the global threshold level, wherein once the optimum exposure time has been found, the following steps are carried out:

f) defining a second range of values of exposure time comprising Q prefixed values between a new minimum and a new maximum value found among the M values of the first range of values and close to the value of the optimum exposure time previously found;

g) repeating the previous steps starting from a) until a new optimum exposure time is found;

h) iteratively repeating the previous steps starting from f), each time defining ranges shorter and shorter which are close to the optimum exposure time previously found.

* * * * *